UNITED STATES PATENT OFFICE 2,475,253

PREPARATION OF SILICA GEL

Jerry A. Pierce, Baton Rouge, La., assignor to Standard Oil Development Company, a corporation of Delaware No Drawing. Application November 23, 1946, Serial No. 711,827

6 Claims. (Cl. 23—182)

The present invention is concerned with improved silica gels. The invention is especially concerned with improved silica gels which, when associated with other compounds such as alumina and magnesia, will produce improved cracking catalysts. The invention is also concerned with the production of improved silica gels suitable for utilization in adsorption, purification, drying and other related processes. The invention is particularly directed to a method of producing silica gel cracking catalysts of improved properties, and particularly adapted to fluidized operations. My catalyst is produced by treating the silica gel before washing with a solution of an alkali metal tartrate and then impregnating the silicate gel with an active catalytic material such as alumina, magnesia and the like.

It is well known in the art to improve the quality of oils, particularly petroleum oils, by treating the same with catalysts under various operating conditions. For example, it is known to treat high-boiling petroleum oils with a catalyst comprising silica and alumina at temperatures in the range from about 600° F. to about 1100° F. in order to crack the oil and to secure petroleum oil fractions boiling in the motor fuel boiling range. Oxides of other metals, as for example, magnesium, manganese, zirconium, beryllium and aluminum are employed in conjunction with the silica. In general particularly desirable catalysts are catalysts comprising silica and alumina.

These cracking catalysts are generally utilized in fluid type catalytic operations. The catalyst particles generally comprise particles having particle sizes in the range from about 0 to 200 microns and higher. The catalyst particles are suspended in a fluid ebullient state in a reaction zone by means of upflowing suspending gases the velocity of which is in the range from about 0.1 to about 5 feet and higher per second.

Heretofore these cracking catalysts have been prepared by various procedures. One method is to prepare the silica hydrogel by mixing an alkali silicate with an acid. The alkali silicate usually comprises a sodium silicate $$(Na_2O.3.25SiO_2)$$

solution having a specific gravity of about 1.2. This is mixed with a sulfuric acid having a specific gravity somewhere in the range of about 1.19. The resulting hydrosol may be impregnated with a soluble salt of a desired metal or the hydrosol may be allowed to gel and the resulting hydrogel washed and soaked in a solution comprising the salt of the desired metal or metals.

One method employed for the preparation of a silica magnesia catalyst is to prepare the hydrogel by the mixing of a silicate and sulfuric acid. The hydrogel is washed and mixed and granulated with magnesia and water. The mixture is passed through a colloid mill and homogenized. The catalyst is aged at room temperature for a period from about 24 to 72 hours. Elevated temperatures have also been employed in which cases, the aging time period is reduced to a period of from about 5 to 10 hours. The catalyst is dried at a temperature in the range from about 200° F. to 270° F. Another method utilized for the preparation of the silica-magnesia catalyst is to prepare the silica hydrogel by mixing sulfuric acid and an alkali metal silicate. The silica hydrogel is washed and impregnated with magnesium sulfate. The impregnated silica hydrogel is treated with an ammonia solution to precipitate the magnesia. This may require a time period of from about 8 to 10 hours. A preferred method of preparing a cracking catalyst comprising silica and magnesia is to add magnesia to a silica hydrosol or to a silica hydrosol impregnated with a metal salt such as with an aluminum salt. The resulting hydrogel is allowed to set and then washed with water preferably at elevated temperatures. The general process comprises adding magnesia preferably as a slurry in water to a silica hydrosol which has been impregnated with a salt, as for example, with an aluminum salt. The action of magnesia is to neutralize the free acid, thus causing rapid setting of the hydrosol to the hydrogel and also to decompose the aluminum salt or other salt present causing precipitation of alumina within and throughout the gel. Excess magnesia used over these requirements remains in the finished product as magnesia. The magnesia employed to neutralize the acid and the salt of the added third metal, reacts to form magnesium sulfate which is removed upon washing. If it is desired to produce a gel comprising silica and magnesia, excess magnesia is added preferably as a water slurry over that required to neutralize the excess acidity thus causing the formation of a gel comprising silica and magnesia.

In fluidized solids operation particularly in fluidized operations in which a silica type catalyst is employed one of the serious problems encountered is attrition of catalysts. However, I have now discovered that providing the silica gel is treated with an alkali tartrate solution particularly with an alkali metal tartrate solution unexpected desirable results are secured with respect to the attrition properties of the catalyst.

The process of my invention may be readily understood by the following examples illustrating embodiments of the same:

Example 1

A number of silica gels were prepared by treating sodium silicate solutions having specific gravities of about 1.21 with dilute acid solutions. The resulting gels were treated with an alkali metal oxalate solution, with an alkali metal sulfate solution, with an alkali metal persulfate solution, with an alkali metal carbonate solution, with an alkali metal phosphate solution, with an alkali metal fluosilicate solution and with an alkali metal boron tetrafluoride solution. No substantial improvement in the hardness of the silica gel was noted. However, another gel was treated with an alkali metal tartrate solution and the improvement in hardness was appreciable.

Example 2

A solution of sodium silicate of 1.21 specific gravity was prepared. A solution of HCl was made by diluting 1410 cc. of 38% HCl with distilled water to make 2 liters. With rapid mechanical stirring 1500 cc. of the silicate was added to 1500 cc. of the acid solution. The sol set to a firm hydrogel within five minutes. It was allowed to stand until syneresis was approximately complete. The water of syneresis was poured off and the hydrogel broken to lumps not larger than 1 inch in diameter. The batch was divided into equal parts. One half was washed free of chlorine ion, dried and activated for 3 hours at 850° F. This was used as a control. The other half was covered with a 10% solution of ammonium tartrate made by mixing stoichiometric amounts of solutions of NH4OH and tartaric acid. The hydrogel was held in contact with the tartrate solution for about 24 hours. It was then washed free of chlorine ion, drained, dried and activated under conditions identical with those when the control sample was made. The finished gel was hard and transparent.

The gel treated in accordance with my invention and the gel not treated were tested with the following results:

|  | Gel treated with Ammonia tartrate | Gel not treated with Ammonia tartrate |
| --- | --- | --- |
| Compression strength (lbs.) | 35.0 | 17.0 |
| Apparent density (8–20 mesh) | .40 | .57 |
| Surface area (m.²/g.) | 602 | 616 |
| Roller analysis (regular apparatus): |  |  |
| microns 0–20 (percent) | 14.8 | 15.9 |
| microns 20–40 | 17.1 | 14.7 |
| microns 40–80 | 23.6 | 28.4 |
| microns 80 plus | 44.5 | 41.0 |
| Roller analysis (after attrition test): |  |  |
| microns 0–20 | 40.6 | 55.7 |
| microns 20–40 | 20.1 | 20.6 |
| microns 40–80 | 10.2 | 10.4 |
| microns 80+ | 29.1 | 13.3 |
| Increase 0–20 microns | 25.8 | 39.7 |
| Decrease 80+ microns | 15.4 | 27.7 |

From the above data it is apparent that the gel treated in accordance with my process possesses properties which make it appreciably more resistant to attrition.

In accordance with my process, I treat a gel which preferably comprises a silica gel with a tartrate solution. The tartrate solution may be any alkali or alkali metal tartrate solution such as ammonium tartrate, sodium tartrate and potassium tartrate. Alkaline earth metal tartrate solutions are also satisfactory. The concentration of the tartrate solution may vary appreciably. However in general, I prefer to employ an alkali tartrate solution having a concentration from about 1% to 10%. The temperature of treatment may likewise vary considerably. However, in general, I prefer the temperature of treatment be in the range from about 75° F. to 175° F. The tartrate treated gel may be dried and activated by any known means. Generally I prefer to dry the tartrate treated gel in the range from about 125° F. to 225° F. and to activate the treated gel in the range from about 700° F. to 1200° F.

The process of my invention is not to be limited by any theory as to mode of operation but only in and by the following claims.

I claim:

1. A process for the preparation of silica gels of improved hardness which comprises adding an alkali metal silicate to an inorganic acid to form an acid silica hydrosol, allowing the sol to set to a firm hydrogel, allowing the hydrogel to stand until syneresis occurs then treating the hydrogel with an aqueous solution of an alkali tartrate for a substantial period of time, sufficient to substantially impregnate said silica gel, washing, drying and activating the tartrate treated gel.

2. The process as defined in claim 1 wherein the alkali tartrate solution comprises an aqueous solution containing 1 to 10% of an alkali metal tartrate.

3. The process as defined in claim 1 wherein the alkali tartrate solution comprises an aqueous solution containing 1 to 10% of an ammonium tartrate.

4. The process as defined in claim 1 wherein the treatment of the hydrogel is for a period of about 24 hours and at a temperature of 75 to 175° F.

5. The process as defined in claim 1 wherein the alkali tartrate solution comprises an aqueous solution containing 1 to 10% of an alkali metal tartrate and the treatment of the hydrogel is for a period of about 24 hours and at a temperature of 75 to 175° F.

6. The process as defined in claim 1 wherein the alkali tartrate solution comprises an aqueous solution containing 1 to 10% of an ammonium tartrate and the treatment of the hydrogel is for a period of about 24 hours and at a temperature of 75 to 175° F.

JERRY A. PIERCE.

REFERENCES CITED

The following references are of record in the file of this patent:

UNITED STATES PATENTS

| Number | Name | Date |
| --- | --- | --- |
| 1,687,919 | Yablick | Oct. 16, 1928 |
| 2,216,262 | Block | Oct. 1, 1940 |
| 2,371,079 | Thomas et al. | Mar. 6, 1945 |